United States Patent [19]
Thuries et al.

[11] 4,300,586
[45] Nov. 17, 1981

[54] STABILIZER FOR STABILIZING THE GAS PRESSURE IN AN AIR BLAST CIRCUIT BREAKER

[75] Inventors: Edmond Thuries, Meyzieu; Jean-Marie Delcoustal, Bron; Jacques Pascal, Lyons, all of France

[73] Assignee: Delle-Alsthom, Villeurbanne, France

[21] Appl. No.: 150,521

[22] Filed: May 16, 1980

[30] Foreign Application Priority Data

May 25, 1979 [FR] France ................. 7913323

[51] Int. Cl.³ .......................................... G05D 11/00
[52] U.S. Cl. .................. 137/110; 137/116.5; 137/492.5
[58] Field of Search .......... 137/110, 116.3, 116.5, 137/492.5

[56] References Cited

U.S. PATENT DOCUMENTS

| | | | |
|---|---|---|---|
| 2,888,027 | 5/1959 | Gerwig et al. | 137/116.5 |
| 3,064,670 | 11/1962 | Peras | 137/116.5 |
| 4,055,198 | 10/1977 | Iannelli | 137/116.5 |
| 4,111,222 | 9/1978 | Hassell | 137/116.5 |

FOREIGN PATENT DOCUMENTS

| | | |
|---|---|---|
| 666970 | 10/1938 | Fed. Rep. of Germany |
| 1090315 | 3/1955 | France |
| 1102241 | 3/1961 | Fed. Rep. of Germany |

*Primary Examiner*—H. Jay Spiegel
*Attorney, Agent, or Firm*—Sughrue, Mion, Zinn, Macpeak and Seas

[57] ABSTRACT

A stabilizer (1) includes a first passage (20–23) which connects a compressed gas source (2–3) to the circuit breaker and a second passage (9, 16, 34, 22) which makes the circuit breaker communicate with the atmosphere, these passages being normally closed, as well as means (10) for opening the first passage when the gas pressure in the circuit breaker is lower than a first value and means (31, 13) for opening the second passage when the gas pressure in the circuit breaker is higher than a second value. Application to high-tension air blast circuit breaker.

8 Claims, 6 Drawing Figures

STABILIZER FOR STABILIZING THE GAS PRESSURE IN AN AIR BLAST CIRCUIT BREAKER

The present invention relates to a stabilizer for stabilizing the gas pressure in a gas blast circuit breaker such as an air blast circuit breaker.

BACKGROUND

It is known that air-blast circuit breakers release into the atmosphere a large quantity of air each time the circuit breaker is opened. It is necessary to compensate these air losses so as to avoid a reduction in pressure which is detrimental to the proper operation of the circuit breaker. The compensation must take place very rapidly since the circuit breaker may be subjected to opening and closing cycles which succeed one another at a high rate, the interval of time between two opening operations possibly being of the order of about a few tenths of a second.

Other smaller losses of air occur when the circuit breaker closes. Also, said circuit breaker generally has a low continuous leakage flow of air while it is in operation.

Conversely, the gas pressure of an air blast circuit breaker may increase due to an operational incident or even because of a rise in the outside temperature. In some cases, said pressure may reach a dangerous level for the safety of the installation.

It is known to compensate the air losses by using a large compressed air tank, said tank being connected permanently to the internal volume of the circuit breaker. Said disposition has the disadvantage of being expensive and of requiring periodic checks on the tank.

An injector is also known which is capable of systematically injecting a quantity of air into the circuit breaker each time it has been opened; the injection command is triggered by the opening command. Such an injector makes it possible to avoid having to install a large extra tank but has the disadvantage of causing an excess of pressure in the circuit breaker if the opening command is not effective.

OBJECT OF THE INVENTION

The present invention aims to overcome the disadvantages of the above-described known arrangements and to produce an arrangement which is not too bulky and whose cost is relatively low, said arrangement being capable of effectively and accurately adjusting the gas pressure in an air-blast circuit breaker.

THE INVENTION

The present invention provides a gas pressure stabilizer for an air-blast circuit breaker, said stabilizer including a first passage which makes a compressed gas source communicate with the circuit breaker and a first valve disposed in the first passage to control the passage of the gas therein, said stabilizer further including: first means which communicate with the circuit breaker and are sensitive to the gas pressure therein, said means keeping the first valve closed when the pressure of the gas in the circuit breaker is higher than a first predetermined value $P_1$, $P_1$ being lower than the pressure of the gas which comes from the source, said means keeping the first valve open when the pressure of the gas in the circuit breaker is lower than $P_1$; a second passage making the circuit breaker communicate with atmospheric air; a second valve disposed in the second passage to control the passing of the gas in said passage; and second means which communicate with the circuit breaker and are sensitive to the pressure of the gas therein to keep the second valve closed when the pressure of the gas in the circuit breaker is lower than a second predetermined value $P_2$, $P_2$ being higher than $P_1$, and to keep the second valve open when the pressure of the gas in the circuit breaker is higher than $P_2$.

BRIEF DESCRIPTION OF THE DRAWINGS

A particular embodiment of the present invention is described hereinbelow by way of example and with reference to the accompanying drawings, in which.

DETAILED DESCRIPTION

Figure 1:
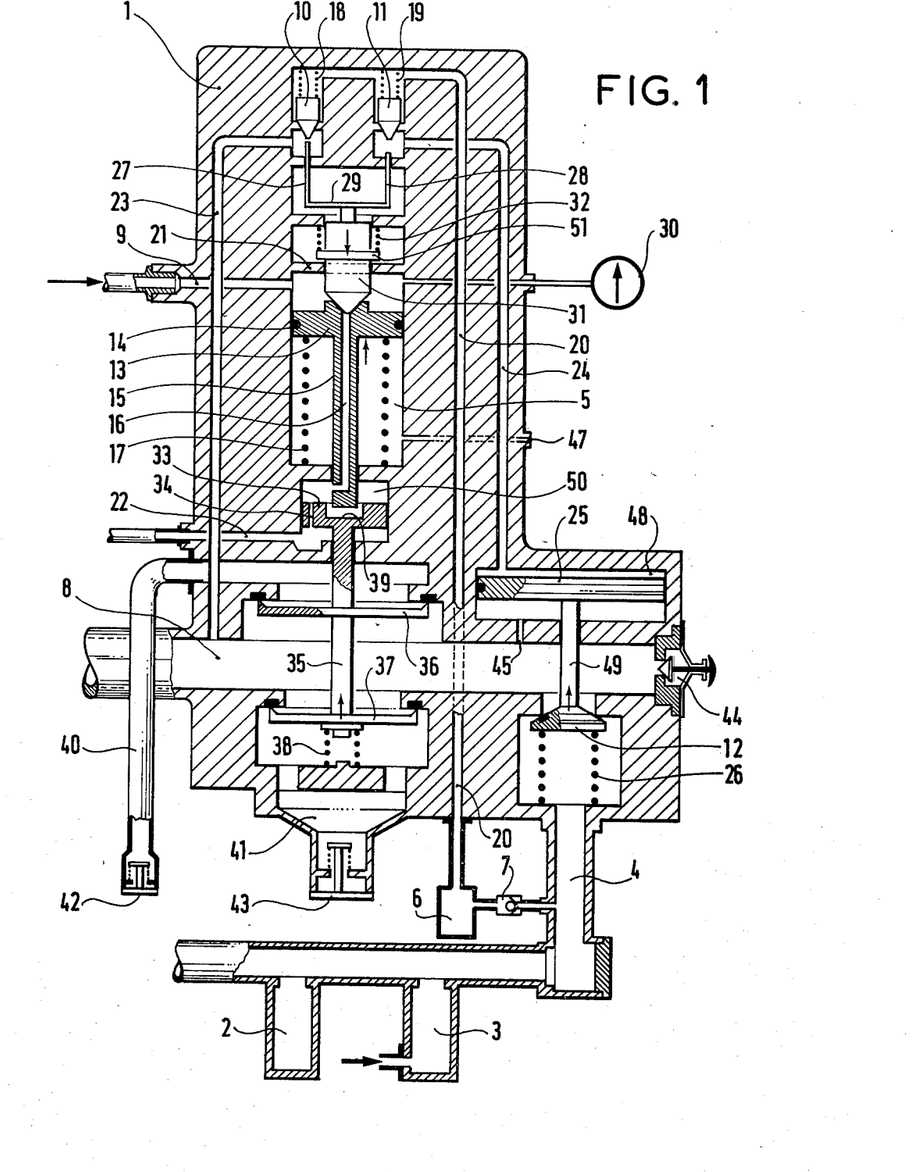
FIGS. 1 to 6 show cross-sections of the same embodiment of the stabilizer in accordance with the invention, the units of said stabilizer occupying different positions in these various figures according to the value of the gas pressure in the circuit breaker.

In FIG. 1, a gas pressure stabilizer 1 is connected to the outlet of a compressed air source which may include, for example, two small tanks schematically shown at 2 and 3. The compressed air source feeds a passage 4 of large cross-section connected by a valve 12 to another passage 8 which is also of large cross-section, said valve 12 being situated at one end of the passage 8 while the other end of the passage is connected to an air blast circuit breaker, not shown. A passage 20, of small cross-section, includes, in series, a pressure stabilization chamber 6 and a non-return valve 7 connected to the passage 4. The passage 20 is connected by a valve 10 to another passage 23 which is of small cross-section and which leads into the passage 8 at the input of the circuit breaker. The passage 20 is also connected to another passage 24 of small cross-section via a valve 11 disposed near the valve 10. The passage 24 leads to the plane surface of a cylinder 48 in which a piston 25 is slidably mounted, said piston being provided with a control rod 49 which is integral with the moving cap of the valve 12.

The stabilizer 1 further includes another cylinder 5 with a vertical axis in which a piston 13 is slidably mounted by means of a piston ring seal 14, said piston dividing the volume of the cylinder 5 into two parts. The upper part of the volume of the cylinder 5 is provided with a stop 21. Said upper part communicates with the internal volume of the circuit breaker via a duct 9 which is of small cross-section. A pressure gauge 30 is disposed to monitor the pressure of the air contained in said upper part. In the lower part of the volume of the cylinder 5, an axial rod 15 which is integral with the piston 13 passes through the plane surface which delimits the bottom of the cylinder 5. A spring 17 is disposed between said lower plane surface and the piston 13. An axial duct 16 passes through the rod 15 and the piston 13. The conical lower end of a cap 31 engages in the flared upper end of the duct 16, said cap being pressed against the piston 13 by a spring 32. The cap 31 has a collar 51 located above the stop 21. A yoke 29 which has two arms 27 and 28 of unequal lengths is fixed on the upper part of the cap 31; the free ends of these arms are opposite to respective ones of the moving caps of the valves 10 and 11.

The stabilizer 1 also includes a cylinder 50 disposed coaxially under the cylinder 5. A piston 33 is slidably mounted in the cylinder 50. The lower end of the rod 15 can abut against a surface 39 of the piston 33. The volume of the cylinder 50 is divided into two parts by the piston 33 which has an orifice via which the two parts communicate. The lower part of the internal volume of the cylinder 50 is connected to atmospheric air by a duct 22.

The piston 33 is provided with a vertical rod 35 which passes through the lower plane surface of the cylinder 50. The rod 35 is integral with the moving parts of two valves 36 and 37 of large cross-section. These valves are normally closed due to the action of a spring 38. When they are open, they make the passage 8 communicate with atmospheric air via two exhaust pipes 40 and 41 respectively, said pipes being of large cross-section and provided with non-return valves 42 and 43.

The lower part of the volume of the cylinder 5 is made to communicate with the atmosphere via an orifice 47. Similarly, the volume of cylinder 48 located under piston 25 is connected to the passage 8 by a pressure equilization orifice 45.

Lastly, the passage 8 may include a venting valve 44.

According to a particular embodiment illustrated in FIGS. 1 to 5, the moving parts of the valves of the stabilizer move along axes parallel to the axis of the cylinder 5. This facilitates manufacture of the stabilizer.

In FIG. 1, the moving units of the stabilizer 1 are illustrated in the positions they occupy when the air pressure in the circuit breaker is equal to the required nominal pressure, the value of said pressure being illustrated by the vertical direction of the needle of the pressure gauge 30. The position occupied in the cylinder 5 by the piston 13 results from an equilibrium between the pressure of the gas in the circuit breaker and the pressure exerted by the spring 17. The collar 51 is located at a very short distance above a stop 21, a core being applied against the piston 13 by the spring 32 so as to close the duct 16. The ends of the arms 27 and 28 of the yoke 29 are not in contact with the moving caps of the valves 10 and 11. These valves therefore remain closed by respective springs 18 and 19. The piston 25, both of whose surfaces are subjected to a pressure equal to the pressure of the circuit breaker, does not exert any thrust on the valve 12 which is closed by a spring 26 and by the high pressure of the source. Likewise, valves 36 and 37 are closed by a spring 38, the lower portion of the rod 15 not touching the surface 39 of the piston 33. Since all the valves are closed, no air is discharged by the pressure source towards the circuit breaker nor by the circuit breaker towards the atmosphere.

Figure 2:
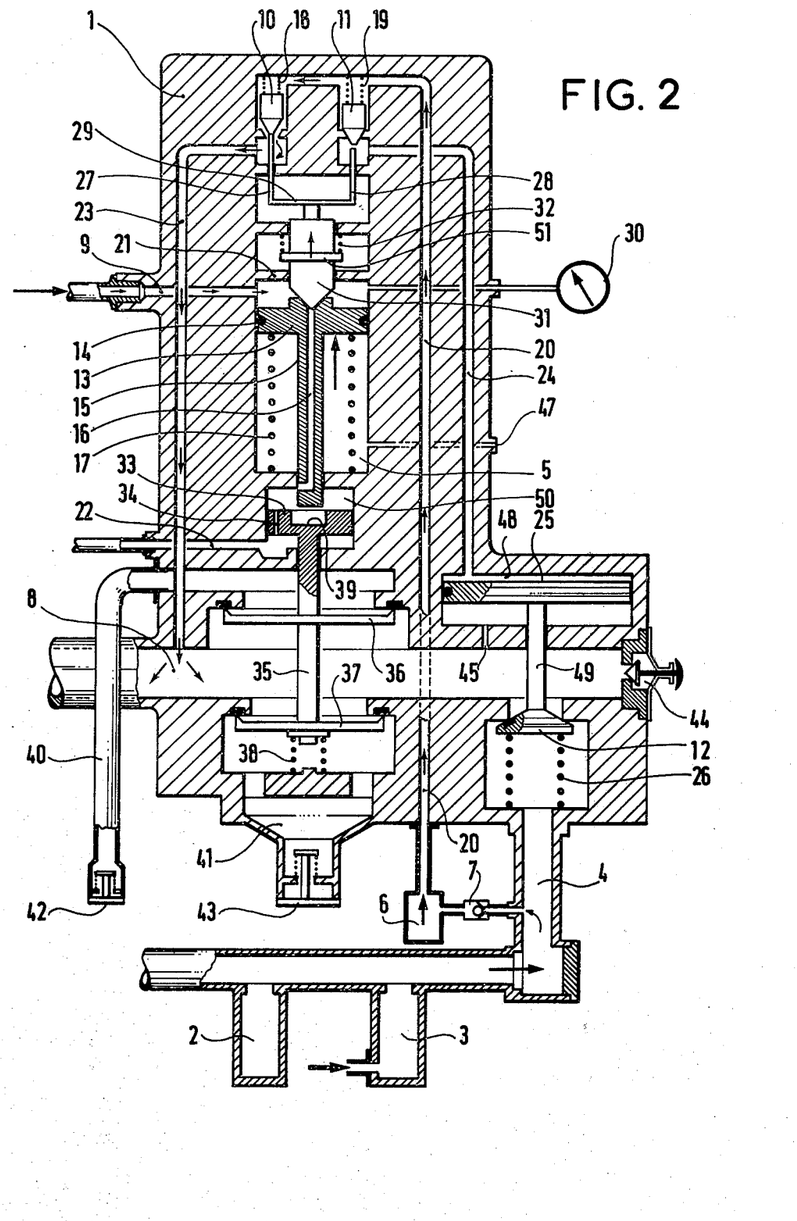
Figure 3:
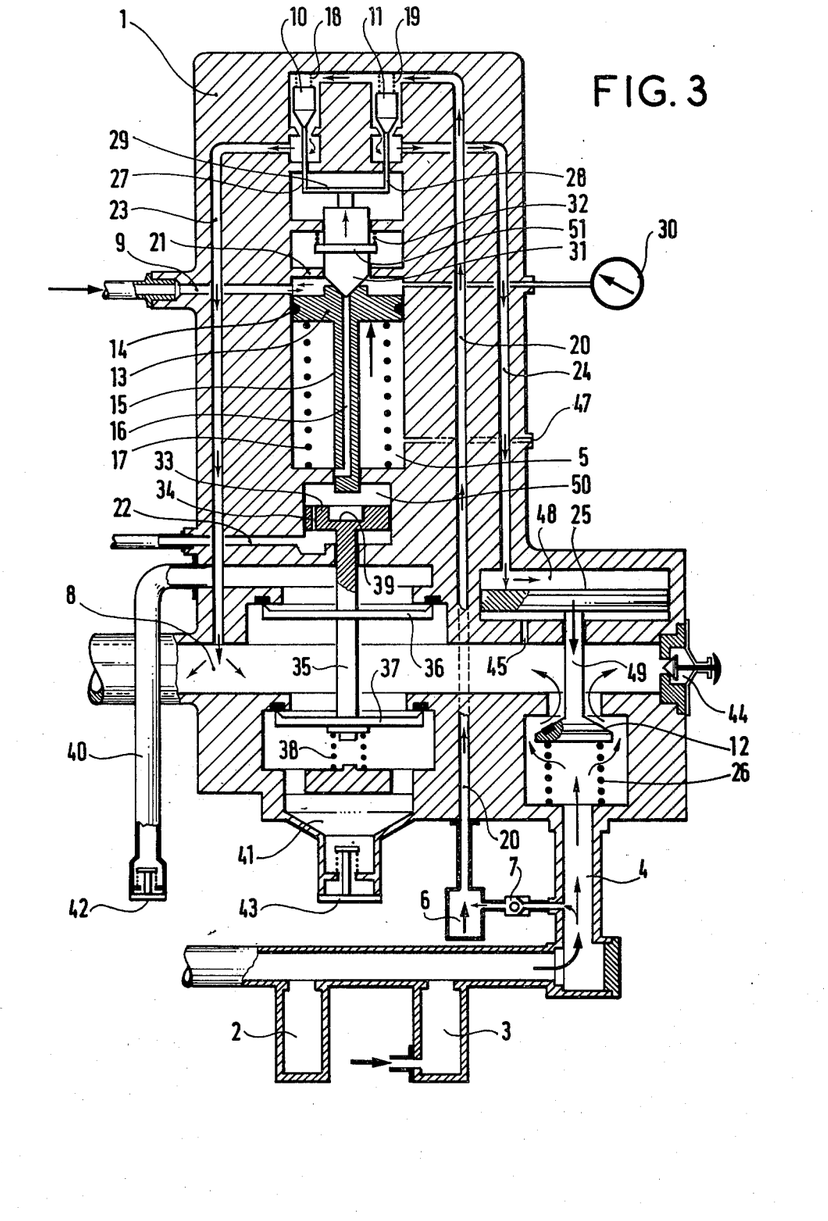
Figure 4:
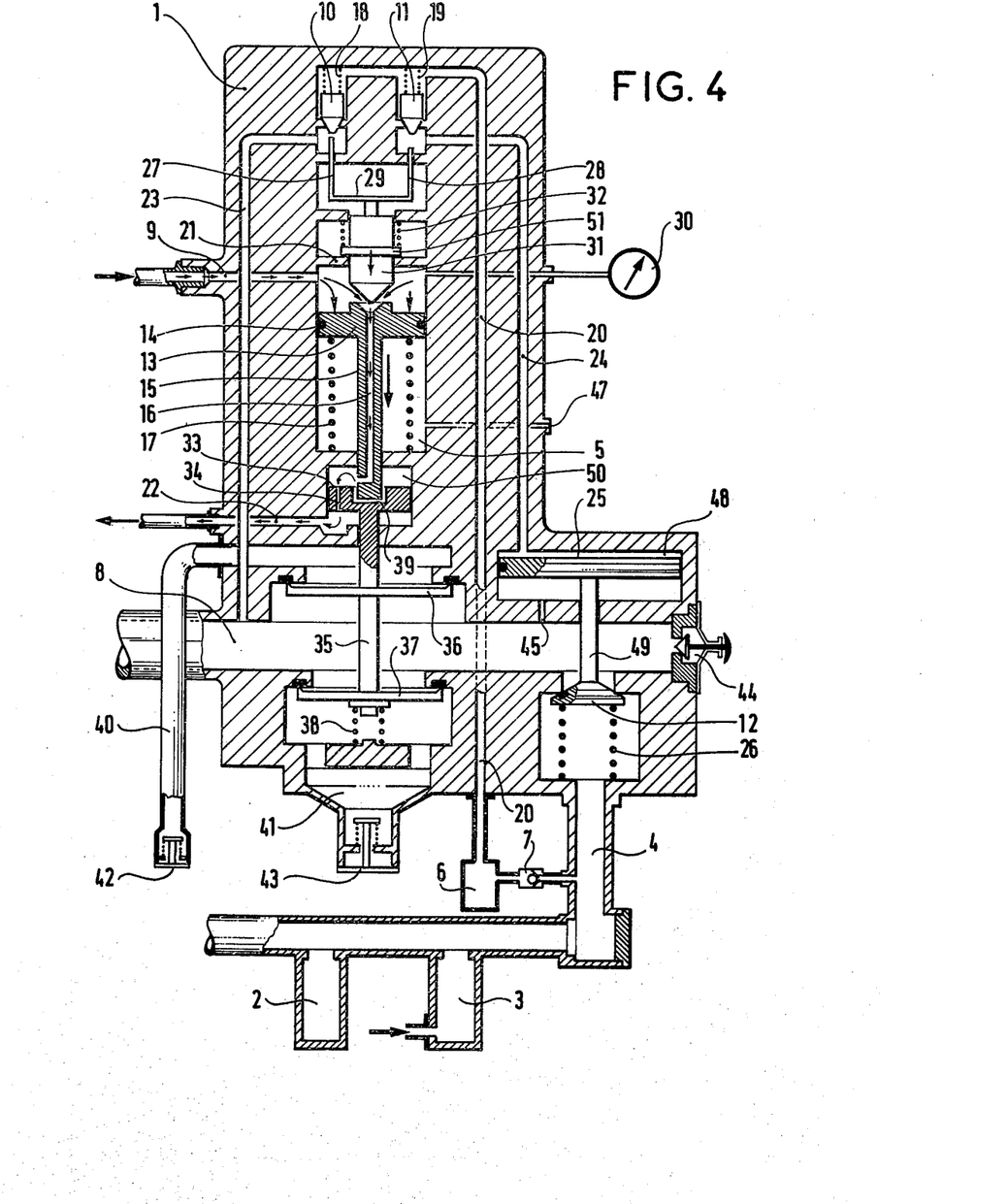

FIG. 2 shows how the moving parts of the stabilizer 1 are disposed when the air pressure in the circuit breaker is established at a predetermined value a little lower than the regulation pressure. Due to said pressure drop, the piston 13 rises towards the upper surface of the cylinder 5 to occupy the position shown in the figure. The rising of the piston 13 causes the cap 31 to rise and compresses the spring 32. The arm 27 of the yoke 29 which is integral with the cap 31 raises the moving cap of the valve 10 which opens, the valve 11 remaining closed. Since the pressure of the compressed air from the source is higher than that of the circuit breaker, a flow of air is established between the source and the circuit breaker via the passages 20 and 23 of small cross-section which are interconnected by the open valve 10. If the pressure drops slowly, e.g. if the pressure drop is caused by a continuous slight leakage of the circuit breaker, said flow air is sufficient to re-establish the nominal pressure in the circuit breaker.

In contrast in the case of a sudden pressure drop due e.g. to the opening of the circuit-breaker, said air flow is insufficient to compensate said pressure drop. The piston 13 the continues to rise in the cylinder 5 towards its upper plane surface and occupies the position illustrated in FIG. 3, said position corresponding to a lower pressure in the circuit breaker. The arm 28 of the yoke 29 then raises the moving cap of the valve 11. This causes said valve to open, the valve 10 obviously remaining open. The compressed air of the source which arrives via the passage 20 passes through the valve 11 and, passing through the passage 24, it fills the upper volume of the cylinder 48. The piston 25 is pushed back downwards and opens the valve 12. The compressed air from the source then enters the circuit breaker via the passages 4 and 8 which let a large flow through. The rapid rise in pressure in the circuit breaker then causes the piston 13 to lower and the valves 11 and 12, then 10, to be closed successively by the springs 19, 26 and 18 respectively.

It is now assumed that the air pressure in the circuit breaker rises slowly, e.g. subsequent to a rise in the temperature of the atmosphere. The piston 13 then drops below its regulation position (FIG. 1) to occupy the position illustrated by FIG. 4, said position corresponding to a pressure in the circuit breaker slightly above the nominal pressure. The collar 51 of the cap 31 is blocked by the stop 21. This causes the upper orifice of the duct 16 to open. The cap 31, the piston 13, the spring 32 and the stop 21 therefore form a valve. The slightly overpressure air of the circuit breaker fills the upper volume of the cylinder 5 and can then flow out via the open valve into the duct 16 which communicates with the upper volume of the cylinder 50. Said air finally flows out into the atmosphere via the orifice 34 of the piston 33 and the duct 22.

If the overpressure is too high for the gas to be removed via the ducts 16, 34 and 22 at a relatively low flow rate, the pressure increases in the upper volume of the cylinder 5. This lowers the piston 13 again (see FIG. 5).

Figure 5:
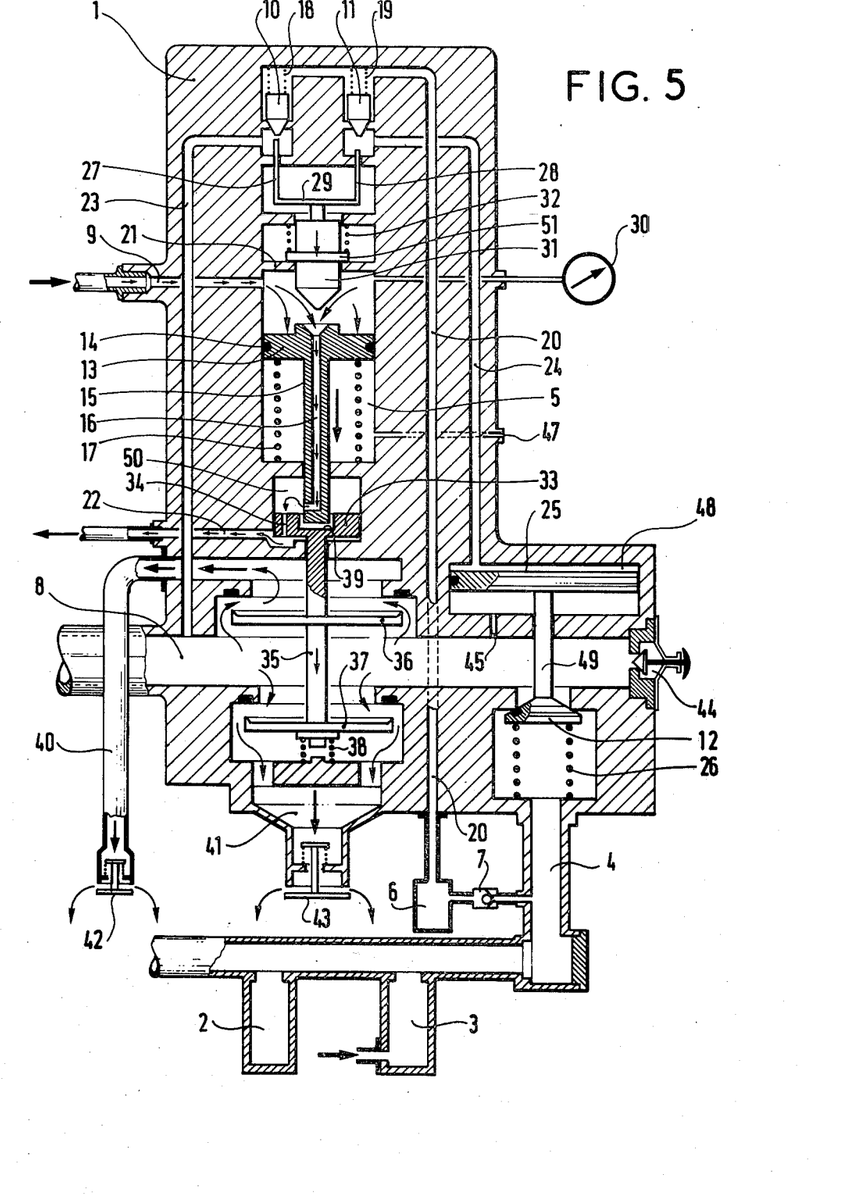

The flow rate through the orifice 34 becomes less than that through the open valve 13, 31 and through the duct 16; the pressure increase which results therefrom in the volume 50 on the upper surface of the piston 33 opens the high discharge rate valves 36 and 37.

Figure 6:
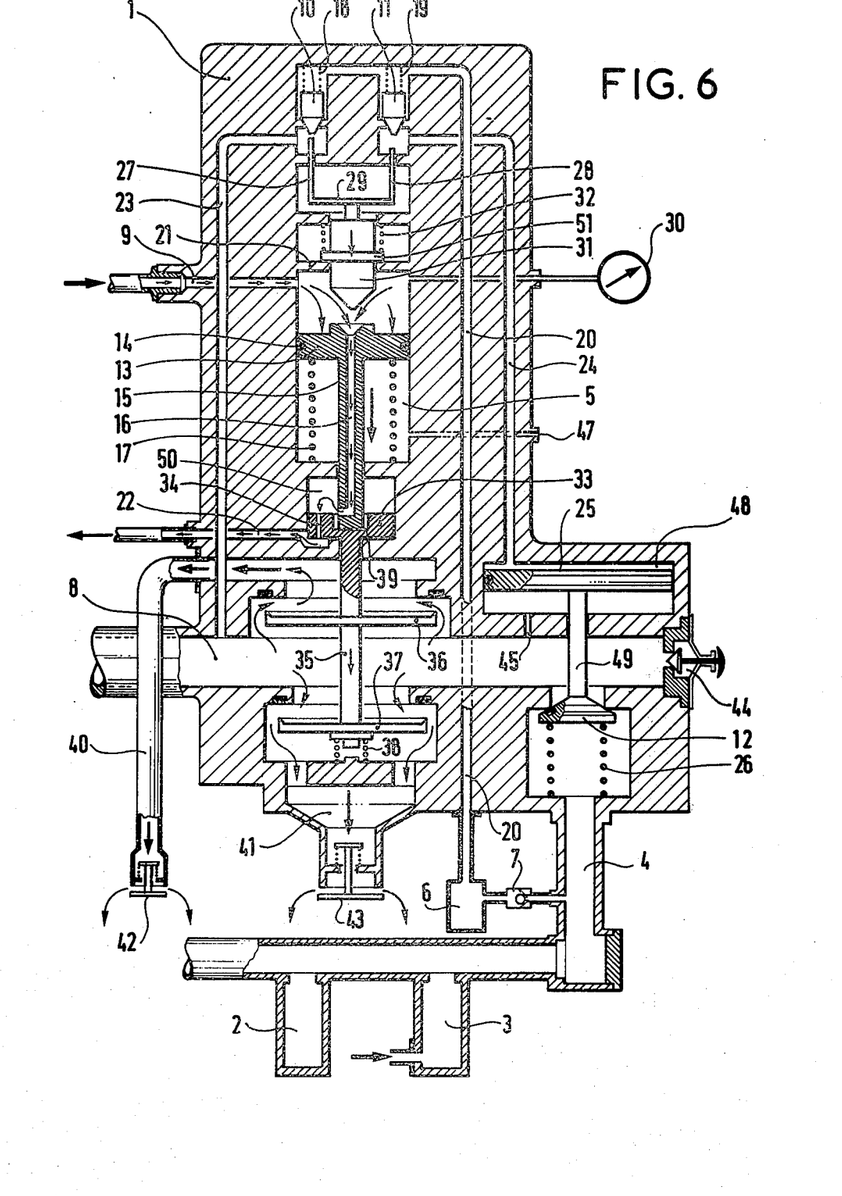

If for any reason the preceding sequence does not take place properly, or if the pressure increases very suddenly, the piston 13 drops to the position illustrated in FIG. 6. The lower end of the rod 15 bears against the surface 39 of the piston 33, thereby opening the high discharge rate valves 36 and 37, as illustrated in FIG. 6. The air compressed to an overpressure in the passage 8 of large cross-section then escapes into the atmosphere via the two large pipes 40 and 41 and the valve 42 and 43.

When the pressure decreases, the piston 13 rises again followed by the piston 33 until the valves 36 and 37 close again. However, as long as the piston 13 does not reach the cap 31 abutting at 21, the air of the circuit breaker continues to escape at a low flow rate into the atmosphere via the duct 16. Then the cap 31 comes into contact again with the piston 13, the position is again that illustrated in FIG. 1.

The stabilizer in accordance with the invention has the following advantages.

To start regulating the pressure in the stabilizer in accordance with the invention, the gas of the circuit breaker is brought to a low pressure (or to an overpressure). Accidental overpressure in the circuit breaker—a danger inherent to devices for controlling the systematic injection of a quantity of gas each time a circuit breaker opening order is given—is thereby avoided. The stabilizer in accordance with the invention is entirely pneumatically controlled, without any electrical control.

The stabilizer in accordance with the invention is not very bulky and does not require the use of voluminous air tanks.

The direct mechanical link between the moving parts of the valves and the circuit breaker pressure control unit 13 allow high adjustment accuracy to be obtained and consequently optimum use of the compressed air. It should be noted that said stabilizer has only one sliding seal (seal 14) in permanent operation.

The stabilizer in accordance with the invention may be applied to high-tension air-blast circuit breakers.

Of course, the invention is in no way limited to the embodiment described and illustrated which is given only by way of example. Although as described above, the stabilizer includes, in all, four regulation levels—two above the nominal pressure and two below said pressure—the stabilizer in accordance with the invention may comprise only two regulation levels on respective sides of the nominal pressure.

We claim:

1. A gas pressure stabilizer for an air-blast circuit breaker, said stabilizer including a first passage for communicating a compressed gas source with the circuit breaker, a first valve disposed in the first passage to control the passage of the gas therein, said stabilizer further including: first means communicating with the circuit breaker and being sensitive to the gas pressure therein for keeping said first valve closed when the pressure of the gas in the circuit breaker is higher than a first predetermined value $P_1$, $P_1$ being lower than the pressure of the gas which comes from the source, and for keeping the first valve open when the pressure of the gas in the circuit breaker is lower than $P_1$; a second passage for communicating the circuit breaker with atmospheric air; a second valve disposed in the second passage to control the passing of the gas in said second passage; and second means communicating with the circuit breaker and being sensitive to the pressure of the gas therein for keeping the second valve closed when the pressure of the gas in the circuit breaker is lower than a second predetermined value $P_2$, $P_2$ being higher than $P_1$, and for keeping the second valve open when the pressure of the gas in the circuit breaker is higher than $P_2$, said first means including a first cylinder having opposed first and second plane surfaces, a first piston provided within said first cylinder and having an axial rod which passes through said first plane surface of said first cylinder and dividing said first cylinder into two parts, a first part located on the side nearest the first plane surface and a second part located on the side nearest the second plane surface of the first cylinder, said second part communicating by a first duct with the internal volume of the circuit breaker, said first means including first resilient means disposed in said first part and exerting on said first piston a bias pressure which opposes the pressure of the gas with which the second part is filled, so that the position of the first piston in the first cylinder depends on the pressure of the gas in the circuit breaker, and a transmission unit actuated by the first piston and capable of opening the first valve when the first piston is located in the first cylinder between the second plane surface and the first position which corresponds to a pressure $P_1$ of the gas in the circuit breaker.

2. A stabilizer according to claim 1, wherein said first piston and said axial rod include an axial duct 16 via which the second part of the volume of the first cylinder communicates with the atmosphere through said second passage, said transmission unit includes a stopper disposed in the second part and mounted for movement along the axis of the first cylinder, second resilient means disposed in the second part and exerting on said stopper a pressure which is sufficient to force it against the piston so as to close off the axial duct, a stop integral with the cylinder for blocking the movement of the stopper 31 to thus open the duct when the first piston is located in the first cylinder between the first surface and a second position which corresponds to a pressure of the gas in the circuit breaker equal to $P_2$, said second passage including the first duct 9, the second part of the volume of the cylinder and said axial duct, the second valve being formed by the moving stopper, the first piston, the second resilient means and the stop.

3. A stabilizer according to claim 2, wherein said transmission unit actuated by the first piston and capable of opening the first valve includes a part which is fixed on the moving stopper.

4. A stabilizer according to claim 3, further including a third passage for communicating the source with the circuit breaker, said third passage having a gas flow cross-section which is larger than that of the first passage, a third valve disposed in the third passage to control the flow of the gas therein, and third means for keeping the third valve closed when the gas pressure in the circuit breaker is higher than a third predetermined value $P_3$ which is lower than $P_1$ and to keep the third valve open when the gas pressure in the circuit breaker is lower than said third value.

5. A stabilizer according to claim 4, within said third means comprises a fourth valve, and a pneumatic circuit, and wherein said part fixed on the movable stopper comprises a yoke forming two arms, one of whose arms actuates the first valve and wherein said third means further includes the other arm of the yoke, the other arm opening said fourth valve when the piston is located in the cylinder between the second surface and a third position corresponding to a gas pressure in the circuit breaker equal to $P_3$, and means responsive to opening of said fourth valve for controlling the feeding of said pneumatic circuit by the source, and means responsive to operation of said pneumatic circuit for opening the third valve.

6. A stabilizer according to claim 5, further including at least a fourth passage for communicating the circuit breaker with the atmosphere, said fourth passage having a flow cross-section larger than that of the second passage, at least a fifth valve disposed in the fourth passage for controlling the flow of the gas therein, and fourth means for keeping the fifth valve closed when the gas pressure in the circuit breaker is lower than a fourth predetermined value $P_4$ which is higher than $P_2$ and to keep the fifth valve open when the gas pressure in the circuit breaker is higher than said fourth value.

7. A stabilizer according to claim 6, further comprising a second cylinder, and wherein the fourth means includes a second piston integral with the fifth valve and having an orifice whose cross-section is less than that of said axial duct, said second piston being disposed adjacent the free end of the axial rod and sliding in said second cylinder, the second piston separating the volume of the second cylinder in two parts—a first part which contains said free end and a second part with which the second passage communicates.

8. A stabilizer according to claim 1 or 7, wherein the movable parts of said valves each have an axis of movement parallel to the axis of said first cylinder.

* * * * *